(12) United States Patent
Edwards et al.

(10) Patent No.: US 9,964,164 B1
(45) Date of Patent: May 8, 2018

(54) DISC BRAKE TONE RING

(71) Applicant: Consolidated Metco, Inc., Vancouver, WA (US)

(72) Inventors: William Joseph Edwards, Portland, OR (US); Andrew James Stratton, Vancouver, WA (US); Sven Arthur Torstveit, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days. days.

(21) Appl. No.: 15/422,045

(22) Filed: Feb. 1, 2017

(51) Int. Cl.
 *F16D 65/12* (2006.01)
 *B60T 8/32* (2006.01)
 *F16D 65/02* (2006.01)

(52) U.S. Cl.
 CPC ............. *F16D 65/12* (2013.01); *B60T 8/329* (2013.01); *F16D 2065/1304* (2013.01); *F16D 2065/1376* (2013.01); *F16D 2065/1396* (2013.01)

(58) Field of Classification Search
 CPC .................................. B60T 8/329; F16D 65/12
 USPC .................................... 188/17, 18 A, 218 XL
 See application file for complete search history.

(56) References Cited

U.S. PATENT DOCUMENTS

| | | | | |
|---|---|---|---|---|
| 6,619,440 | B2* | 9/2003 | Antony | B60T 1/065 188/17 |
| 7,219,778 | B2* | 5/2007 | Pete | B60T 8/329 188/18 A |
| 7,487,862 | B2* | 2/2009 | Carlson | B60T 8/329 188/18 A |
| 7,980,367 | B2* | 7/2011 | Hester | B60T 8/329 188/18 A |
| 8,584,815 | B2* | 11/2013 | Hester | B60T 8/329 188/18 A |
| 8,613,347 | B2* | 12/2013 | Pahle | F16D 65/12 188/17 |
| 9,759,281 | B1* | 9/2017 | Stratton | F16D 66/00 |
| 2006/0272906 | A1* | 12/2006 | Gonska | B60T 8/329 188/218 XL |
| 2007/0051571 | A1* | 3/2007 | Carlson | B60T 8/329 188/218 XL |

* cited by examiner

*Primary Examiner* — Christopher P Schwartz
(74) *Attorney, Agent, or Firm* — Amsted Industries Incorporated

(57) ABSTRACT

An assembly for an induction sensing tone ring is provided. A brake rotor includes a circular pocket. A tone ring is received in the circular pocket of the brake rotor. The brake rotor has a plurality of locating tabs, with each locating tab having a slope surface. The tone ring has a plurality of retaining tabs, with each retaining tab being received between two locating tabs of the brake rotor. A retaining ring is fitted in each locating tab slope surface of the brake rotor to press fit against the retaining tabs of the tone ring.

7 Claims, 2 Drawing Sheets

DISC BRAKE TONE RING

BACKGROUND OF THE INVENTION

The present application relates to a method and an assembly including an inductive tone ring attached to a rotating part for speed and position sensing purposes.

The use of inductive tone rings for positional sensing, as in anti-lock brake applications, is known. However, the installation of the anti-lock brake system sensing ring, particularly to a disc brake rotor, has caused concern. Such concerns include difficult installation and replacement, the use of bolts and screws which can loosen or fail, and thermal transfer from the brake rotor to the tone ring causing dissimilar thermal expansion and warpage. Corrosion of the tone ring or tone ring features formed into the brake rotor is also a major cause of field issues. Often the tone ring will corrode beyond a usable condition prior to the wear limit of the rotor being met.

Accordingly, an improved arrangement and method for installing an inductive tone ring with a disc brake rotor assembly is provided.

SUMMARY OF THE INVENTION

An improved arrangement and method for attaching an inductive tone ring to a rotating part, which in the current manifestation is a brake rotor but could also be applied to a wheel hub, machine spindle or other rotating part in which rotational position or speed measurement is required.

The method as applied to a disc brake assembly comprises a brake rotor having an internal wall forming a circular pocket. An anti-lock brake tone ring is received in the circular pocket adjacent pocket adjacent a top surface of the brake rotor. The brake rotor internal wall includes a plurality of protruding members each having a retaining groove with an upper inclined surface formed in the internal wall of the brake rotor forming the circular pocket.

The tone ring has a plurality of retaining tabs. Each tone ring retaining tab is positioned between two of the brake rotor internal wall protruding members. A retaining ring is fitted into each of the brake rotor protruding member retaining grooves. The retaining ring presses against each of the retaining tabs of the tone ring.

The advantages of the improved tone ring attachment method of the present invention include reduced areas of contact between the brake rotor and the tone ring resulting in a reduction of thermal transfer from the brake rotor to the tone ring. The ring is not rigidly constrained, allowing it to "float" within the rotor attachment to avoid the warping at high temperatures that can occur if the ring is rigidly mounted to the rotor with screws or bolts. Corrosion effects are reduced as a result of the lower temperatures and minimal contact between the tone ring and the rotor. The elimination of screws, bolts or press-fits in the attachment of the tone ring to the brake rotor eases installation and replacement. Further, no drilling or tapping of screw or bolt holes in the rotor is required in order to prepare the rotor to receive the tone ring. The tone ring of the present invention is simply placed into position in the circular pocket of the brake rotor internal wall in engagement with the plurality of protruding members each having a retaining groove. The retaining ring is then fitted into each of the brake rotor protruding member retaining grooves. The retaining ring presses against each of the retaining tabs of the tone ring.

DETAILED DESCRIPTION OF THE DRAWINGS

Figure 1:
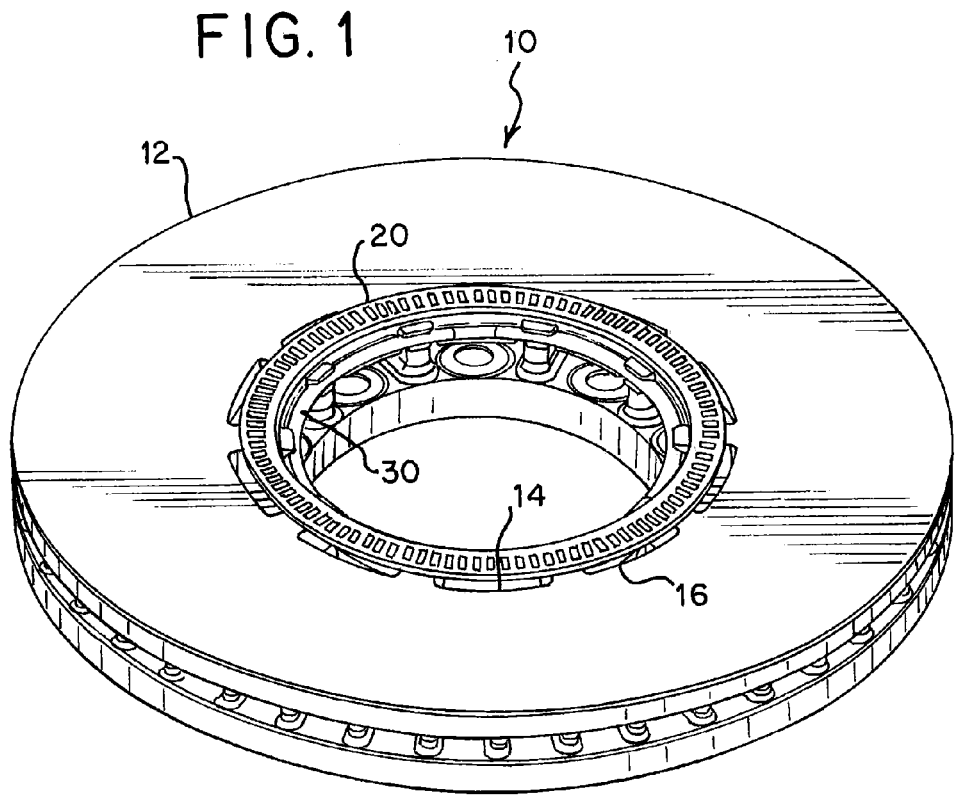
FIG. 1 is a perspective view of an assembled brake rotor and tone ring and retaining ring in accordance with a first embodiment of the present invention.
Figure 2:
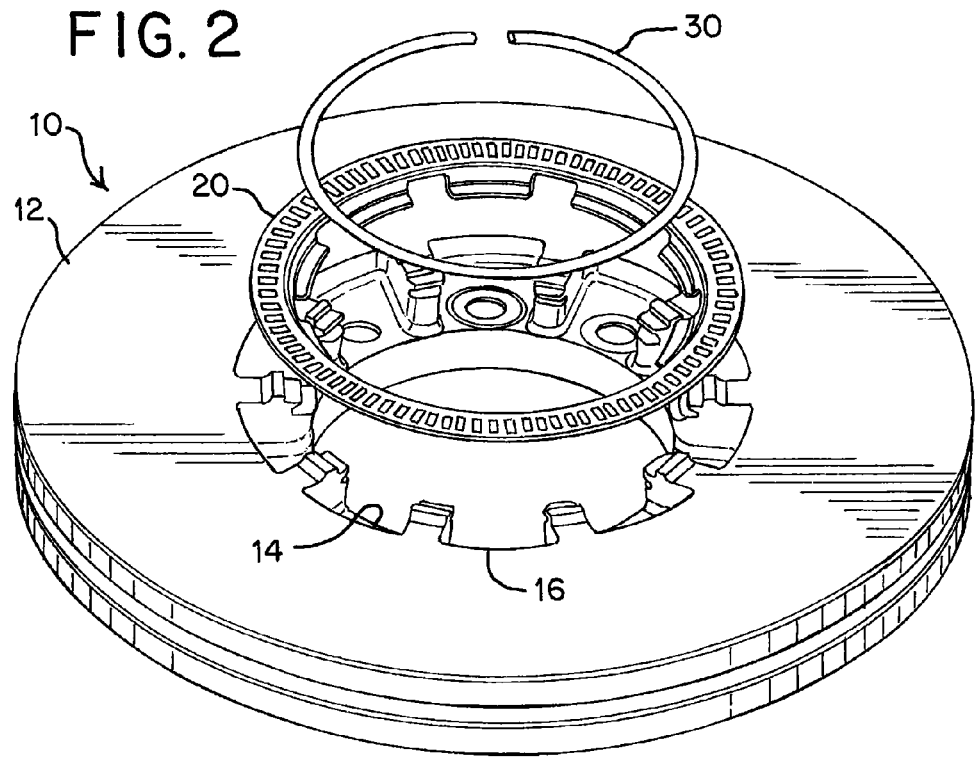
FIG. 2 is a perspective view of a brake rotor and tone ring and retaining ring in accordance with a first embodiment of the present invention with the components separated.
Figure 3:
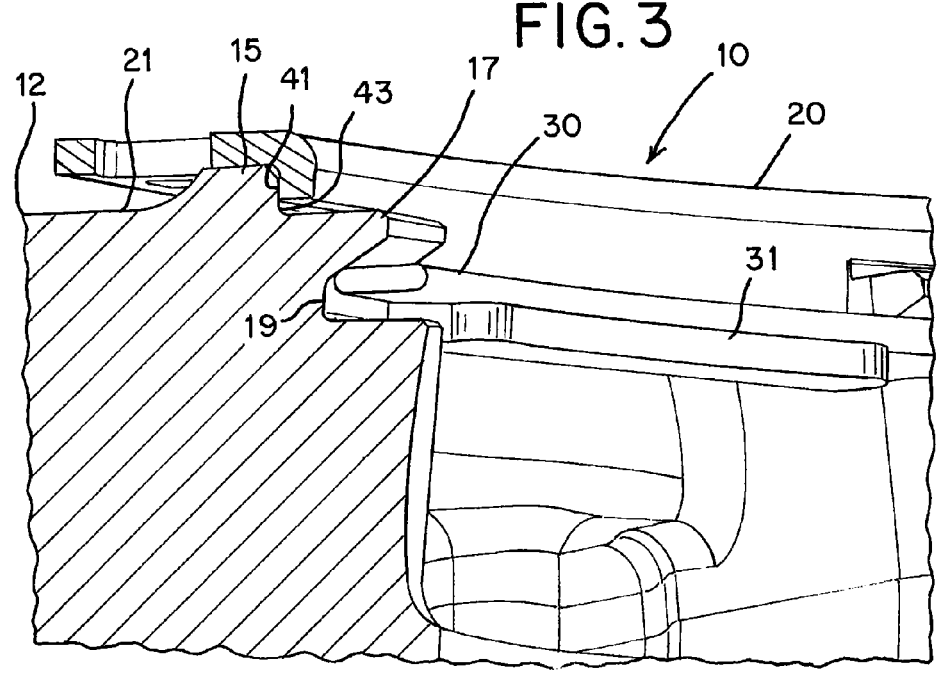
FIG. 3 is a detailed partial view of a brake rotor and tone ring and retaining ring in accordance with a first embodiment of the present invention.

Referring now to FIGS. 1-3, a disc brake assembly in accordance with a first embodiment of the present invention is shown generally at 10. A circular shaped brake rotor is shown at 12, with the usual material for brake rotor 12 being cast iron. Brake rotor 12 includes internal wall 14 which forms circular pocket 16. Snap retaining ring 30 is received in circular pocket 16. Snap retaining 30 is a circular shaped ring.

Tone ring 20 is placed adjacent ridge 15 extending from upper surface 21 of brake rotor 12. Tone ring 12 further includes an axially inner facing lip 41 in radial contact with a radially inward facing surface 43 of ridge 15 of brake rotor 12. Tone ring 20 is comprised of steel or other ferromagnetic materials that are known for use in such inductive tone rings.

Brake rotor 12 further includes a plurality of locating tabs 17. Each locating tab 17 includes a sloped surface 19 formed around and facing radially into circular pocket 16. Slope surface 19 of each locating tab contacts retaining ring 30 to force retaining ring 19 against a retaining tab 31 of tone ring 20. Each retaining tab 31 of tone ring 20 is fitted between two locating tabs 17 of brake rotor 12 to thusly restrict the rotation of tone ring 20 within brake rotor 12.

Tone ring 20 is seen to include inner lip 41 and upper surface 34. Inner lip 41 of tone ring 20 is fit adjacent a radially inward facing surface 43 of ridge 15 of brake rotor 12 to center the tone ring 20 about the rotating axis. A plurality of retaining tabs 31 extend radially inward from tone ring 20.

Upon assembly of disc brake assembly 10, tone ring 20 is placed on one side of brake rotor 12 adjacent ridge 15 extending from surface 21 of brake rotor 12. Tone ring 12 axially inner facing lip 41 is then in radial contact with a radially inward facing surface 43 of ridge 15 of brake rotor 12. Brake rotor 12 further includes a plurality of locating tabs 17. Each locating tab 17 includes a sloped surface 19 formed around and facing radially into circular pocket 16. Slope surface 19 of each locating tab contacts retaining ring 30 to force retaining ring 19 against a retaining tab 31 of tone ring 20. Each retaining tab 31 of tone ring 20 is fitted between two locating tabs 17 of brake rotor 12 to thusly restrict the rotation of tone ring 20 within brake rotor 12.

What is claimed is:

1. A disc brake assembly comprising:
   a brake rotor,
   the brake rotor having an internal wall forming a circular pocket,
   an anti-lock brake sensing ring received in the brake rotor circular pocket,
   the brake rotor having a plurality of locating tabs, each locating tab extending radially inward into the brake rotor circular pocket from the internal wall of the brake rotor,
   each locating tab having a sloped surface as part of a retaining groove, the anti-lock brake sensing ring having a plurality of retaining tabs, each retaining tab being positioned between two adjacent locating tabs of the brake rotor, and a retaining ring positioned against at least two of the sloped surfaces of the retaining groove of the brake rotor, with the retaining ring also positioned against at least two of the retaining tabs of the anti-lock brake sensing ring.

2. The disc brake assembly of claim 1, wherein the brake rotor includes a ridge extending from an upper surface of the brake rotor, and the anti-lock brake sensing ring includes an inward facing surface that is radially adjacent the brake rotor ridge.

3. The disc brake assembly of claim 1, wherein the brake rotor includes a ridge extending from an upper surface of the brake rotor, and the anti-lock brake sensing ring includes an outward facing surface that is radially adjacent the brake rotor ridge.

4. The disc brake assembly of claim 1, wherein each anti-lock brake sensing retaining tab is positioned between two adjacent locating tabs of the brake rotor in a manner such that any rotation of the anti-lock brake sensing ring within the brake rotor circular pocket is restricted.

5. A disc brake assembly comprising:

a brake rotor, the brake rotor having an internal wall forming a circular pocket, an anti-lock brake sensing ring, the brake rotor having a plurality of locating tabs, each locating tab extending radially inward into the brake rotor circular pocket from the internal wall of the brake rotor, each locating tab having a sloped surface as part of a retaining groove, the anti-lock brake sensing ring having a plurality of retaining tabs, each retaining tab being positioned between two adjacent locating tabs of the brake rotor, and a retaining ring positioned against at least two of the sloped surfaces of the retaining groove of the brake rotor, with the retaining ring also positioned against at least two of the retaining tabs of the anti-lock brake sensing ring.

6. The disc brake assembly of claim 5, wherein the brake rotor includes a ridge extending from an upper surface of the brake rotor, and the anti-lock brake sensing ring includes an inward facing surface that is radially adjacent the brake rotor ridge.

7. The disc brake assembly of claim 5, wherein each anti-lock brake sensing retaining tab is positioned between two adjacent locating tabs of the brake rotor in a manner such that any rotation of the anti-lock brake sensing ring within the brake rotor circular pocket is restricted.

\* \* \* \* \*